Patented Oct. 2, 1951

2,569,694

UNITED STATES PATENT OFFICE 2,569,694

2-NITRODIPHENYLAMINE-4-SULFON-MORPHOLIDES

Victor S. Salvin, Irvington, and John R. Adams, Jr., Summit, N. J., assignors to Celanese Corporation of America, New York, N. Y., a corporation of Delaware No Drawing. Application July 14, 1949, Serial No. 104,795

6 Claims. (Cl. 260—239.6)

This invention relates to diphenylamine dyestuffs and relates more particularly to certain novel diphenylamine dyestuffs suitable for the dyeing of cellulose acetate or other organic derivative of cellulose materials.

A wide variety of dyestuffs is available for the dyeing of cellulose acetate or other organic derivative of cellulose materials in a substantially complete range of colors. However, the dyestuffs previously proposed for producing yellow, orange yellow and golden yellow colors on these materials have not been completely satisfactory. Cellulose acetate and other organic derivatives of cellulose materials dyed with such dyestuffs exhibit dyeings in the said colors of a poor wash fastness which impairs their commercial applicability.

It is an important object of this invention to provide novel diphenylamine dyestuffs suitable for dyeing cellulose acetate or other organic derivative of cellulose materials, which will be free from the foregoing and other disadvantages of the prior dyestuffs.

A further object of this invention is the provision of novel diphenylamine dyestuffs capable of dyeing cellulose acetate or other organic derivative of cellulose materials in valuable yellow, orange yellow and golden yellow colors of good wash fastness.

Other objects of this invention will be apparent from the following detailed description and claims.

We have now discovered that diphenylamine dyestuffs of the general formula

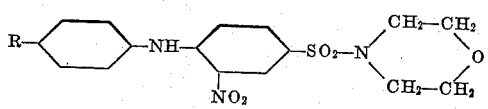

wherein R may be hydrogen, or an alkyl group such as, for example, a methyl, ethyl or propyl group; a hydroxyalkyl group such as, for example, a hydroxymethyl, β-hydroxyethyl or γ-hydroxypropyl group; an alkoxy group such as, for example, a methoxy, ethoxy or propoxy group; an acylamino group such as, for example, an acetylamino, propionylamino, or butyrylamino group; or an aryl group such as, for example, a phenyl group, form a class of dyestuffs which are particularly suited for dyeing cellulose acetate or other organic derivative of cellulose materials in valuable yellow, orange yellow and golden yellow shades of good wash fastness.

The novel dyestuffs of our invention may be readily prepared in good yields by condensing 1-chloro-2-nitrobenzene-4-sulfonmorpholide with aniline or the desired para-substituted aniline in the presence of an acid binding agent such as sodium carbonate. Examples of suitable para-substituted anilines which may be employed in forming the novel dyestuffs of our invention are p-methylaniline, p-ethylaniline, p-propylaniline, p-hydroxymethylaniline, p-β-hydroxyethylaniline, p-γ-hydroxypropylaniline, p-methoxyaniline, p-ethoxyaniline, p-n-propyloxyaniline, p-acetylaminoaniline, p-propionylaminoaniline, p-n-butyrylaminoaniline and p-phenylaniline.

The condensation reaction may be carried out in a suitable inert liquid medium such as, for example, water, or an organic liquid such as ethyl alcohol, amyl alcohol, ethylene glycol monoacetate, or the mono-ethyl ether of ethylene glycol. The reaction may also be carried out in the presence of an excess of the aniline, which excess acts as a solvent during the condensation.

When the condensation reaction is carried out in an inert liquid medium, from 1 to 3 moles of aniline or the para-substituted aniline may be employed for each mole of 1-chloro-2-nitrobenzene-4-sulfonmorpholide, the reaction mixture being maintained at reflux temperatures, i. e. from 80 to 140° C., until the reaction is completed, say, for 2 to 12 hours. Where an excess of aniline or the para-substituted aniline serves as the reaction medium, from 3 to 5 moles thereof may be employed for each mole of 1-chloro-2-nitrobenzene-4-sulfonmorpholide, the condensation reaction being carried out at a temperature sufficiently high to maintain the reactants in a molten condition, i. e. from 100 to 140° C. Under these conditions, the reaction may be completed in from 2 to 6 hours.

When the liquid medium in which the condensation reaction is carried out is a solvent for the dyestuff, recovery of the dyestuff may be effected by drowning the reaction mass in water and filtering off the dyestuff precipitate which forms. Where, on the other hand, the condensation reaction is carried out in water or other liquid medium in which the dyestuff is insoluble, the dyestuff usually crystallizes out as the reaction proceeds or when the reaction mass is cooled and may be recovered by a simple filtration.

In place of sodium carbonate, we may employ other acid binding agents such as, for example, magnesium oxide, calcium carbonate, calcium hydroxide or the alkali metal or alkaline earth metal salt of an organic acid such as sodium formate, sodium propionate, potassium acetate, calcium acetate, potassium formate, calcium formate, calcium propionate and potassium propionate.

The following examples are given to illustrate our invention further.

Example I

A mixture of 4 parts by weight of 1-chloro-2-nitrobenzene-4-sulfonmorpholide, 4 parts by weight of aniline and 1 part by weight of sodium carbonate in 100 parts by weight of water is heated to reflux for 3 hours with stirring. During this time a precipitate of the dyestuff forms in the reaction mixture. The reaction mixture is filtered to separate the dyestuff, which is then washed thoroughly with hot water to remove excess aniline therefrom. There are obtained 4.4 parts by weight or 92% of theoretical of the dyestuff 2-nitrodiphenylamine-4-sulfonmorpholide. This dyestuff dyes cellulose acetate fabrics in yellow shades, which meet A. A. T. C. C. test 2 for wash fastness.

Example II

A mixture of 3.5 parts by weight of 1-chloro-2-nitrobenzene-4-sulfonmorpholide, 3.5 parts by weight of p-methoxy-aniline and 1 part by weight of sodium carbonate in 100 parts by weight of water is heated to reflux for 3 hours with stirring. During this time a precipitate of the dyestuff forms in the reaction mixture. The reaction mixture is filtered to separate the dyestuff, which is then thoroughly washed with hot water to remove excess p-methoxy-aniline therefrom. There are obtained 4.5 parts by weight or a quantitive yield of the dyestuff 4'-methoxy-2-nitrodiphenylamine-4-sulfonmorpholide. This dyestuff dyes cellulose acetate fabrics in orange yellow shades, which meet the A. A. T. C. C. test 2 for wash fastness.

It is to be understood that the foregoing detailed description is given merely by way of illustration and that many variations may be made therein without departing from the spirit of our invention.

Having described our invention, what we desire to secure by Letters Patent is:

1. Diphenylamine dyestuffs of the following general formula:

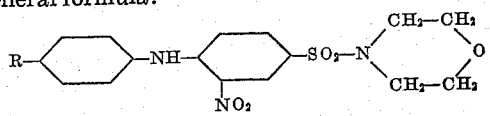

wherein R is a member of the group consisting of hydrogen, alkyl, hydroxyalkyl, alkoxy, acylamino, and phenyl radicals.

2. The diphenylamine dyestuff 2-nitrodiphenylamine-4-sulfonmorpholide.

3. The diphenylamine dyestuff 4'-methoxy-2-nitrodiphenylamine-4-sulfonmorpholide.

4. Process for the preparation of diphenylamine dyestuffs, which comprises condensing at reflux temperature 1-chloro-2-nitro-4-sulfonmorpholide with a compound of the following general formula:

wherein R is a member of the group consisting of hydrogen, alkyl, hydroxyalkyl, alkoxy, acylamino and phenyl radicals.

5. Process for the preparation of a diphenylamine dyestuff which comprises condensing 1-chloro-2-nitro-4-sulfonmorpholide with aniline at reflux temperature.

6. Process for the preparation of a diphenylamine dyestuff, which comprises condensing 1-chloro-2-nitro-4-sulfonmorpholide with p-methoxy-aniline at reflux temperature.

VICTOR S. SALVIN.
JOHN R. ADAMS, JR.

REFERENCES CITED

The following references are of record in the file of this patent:

UNITED STATES PATENTS

| Number | Name | Date |
|---|---|---|
| 2,080,704 | Fischer et al. | May 18, 1937 |
| 2,270,570 | West et al. | Jan. 20, 1942 |
| 2,373,335 | Paul | Apr. 10, 1945 |
| 2,422,029 | McNally et al. | June 10, 1947 |
| 2,466,010 | Dickel et al. | Apr. 5, 1949 |

FOREIGN PATENTS

| Number | Country | Date |
|---|---|---|
| 210,833 | Switzerland | Aug. 10, 1940 |

OTHER REFERENCES

Naegeli et al.: Helv. Chim. Acta., vol. 21 (1938), pp. 1746–1747.